United States Patent
Zhong et al.

(10) Patent No.: US 8,128,167 B2
(45) Date of Patent: Mar. 6, 2012

(54) SEAT CUSHION EXTENSION MECHANISM

(75) Inventors: Harry Zhong, Canton, MI (US);
Dumitru Dan Nae, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 12/652,472

(22) Filed: Jan. 5, 2010

(65) Prior Publication Data

US 2011/0163583 A1 Jul. 7, 2011

(51) Int. Cl.
*A47C 7/14* (2006.01)

(52) U.S. Cl. ................................ 297/284.11

(58) Field of Classification Search .......... 297/284.11, 297/452.41, DIG. 3
See application file for complete search history.

(56) References Cited

U.S. PATENT DOCUMENTS

| | | | |
|---|---|---|---|
| 3,635,524 A * | 1/1972 | Faust | 297/284.11 |
| 3,792,501 A * | 2/1974 | Kery | 5/12.1 |
| 4,165,126 A | 8/1979 | Strien et al. | |
| 4,334,709 A | 6/1982 | Akiyama et al. | |
| 4,541,669 A | 9/1985 | Goldner | |
| 4,629,248 A | 12/1986 | Mawbey | |
| 4,773,703 A | 9/1988 | Krugener et al. | |
| 4,775,185 A | 10/1988 | Scholin et al. | |
| 5,082,326 A | 1/1992 | Sekido et al. | |
| 5,584,532 A | 12/1996 | Marechal | |
| 5,599,062 A | 2/1997 | Hagedorn et al. | |
| 5,607,204 A | 3/1997 | Gryp | |
| 6,386,633 B1 | 5/2002 | Newton | |
| 6,402,245 B1 | 6/2002 | Newton et al. | |
| 7,497,462 B2 | 3/2009 | Sakai et al. | |
| 2001/0004164 A1* | 6/2001 | Mattsson | 297/284.11 |
| 2008/0157577 A1* | 7/2008 | Lindsay | 297/284.11 |
| 2008/0157578 A1 | 7/2008 | Snyder | |
| 2008/0191531 A1 | 8/2008 | Hoffmann | |
| 2008/0191532 A1 | 8/2008 | Wain | |
| 2009/0033134 A1 | 2/2009 | Hofmann et al. | |

* cited by examiner

*Primary Examiner* — Milton Nelson, Jr.
(74) *Attorney, Agent, or Firm* — Gregory P. Brown; Price Heneveld LLP (57) ABSTRACT

A vehicle seat including a seat base. An extension member is operably connected to the seat base. A seat cover partially extends over the extension member and seat base and partially stored on a roller below the seat pan. A bladder is disposed between the seat base and the extension member. Inflation of the bladder forces the extension member forward relative to the seat base and unroll a portion of the seat cover.

18 Claims, 7 Drawing Sheets

SEAT CUSHION EXTENSION MECHANISM

FIELD OF THE INVENTION

The present invention generally relates to a seat cushion mechanism, and more particularly relates to a seat cushion extension that extends forward by way of a bladder.

BACKGROUND OF THE PRESENT INVENTION

It is often desirable to provide a vehicle seat that is movable to a variety of positions to accommodate passengers of varying sizes.

SUMMARY OF THE PRESENT INVENTION

One aspect of the present invention includes a vehicle seat including a seat base. An extension member is operably connected to the seat base. A seat cover partially extends over the extension member and seat base and is partially stored on a roller below the seat pan. A bladder is disposed between the seat base and the extension member. Inflation of the bladder forces the extension member forward relative to the seat base and unrolls a portion of the seat cover.

Another aspect of the present invention includes a vehicle seat extension mechanism including an extension member operably connected to a seat base. A seat cover is fixedly connected to a portion of the seat base and slidable over the extension member. An inflatable bladder is disposed between the seat base and the extension member. Inflation of the bladder forces the extension member to move forward relative to the seat base and slide forward under the seat cover.

Yet another aspect of the present invention includes a method for making a method for extending a vehicle seat including operably connecting an extension member with a seat base. A seat cover is fixedly connected to the seat base. The extension member is slidably engaged below the seat cover. An inflatable bladder is positioned between the seat base and the extension member. The bladder is inflated to force the extension member to move forward relative to the seat base and slide forward under the seat cover.

These and other aspects, objects, and features of the present invention will be understood and appreciated by those skilled in the art upon studying the following specification, claims, and appended drawings.

DETAILED DESCRIPTION OF EMBODIMENTS

Figure 1:
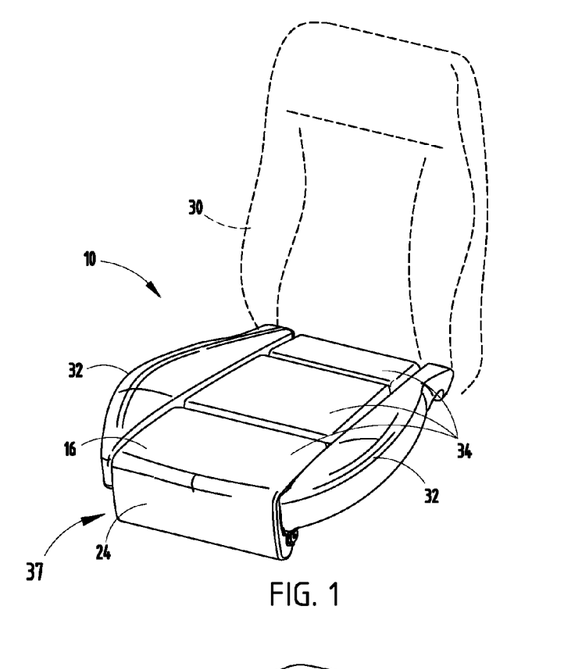
FIG. 1 is a top perspective view of a seat incorporating one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-3A, the reference numeral 10 generally designates a vehicle seat including a seat base 12. An extension member 14 is operably connected to the seat base 12. A seat cover 16 partially extends over the extension member 14 and the seat base 12 and is partially stored on a roller 18 below a seat pan 20. A bladder 22 is disposed between the seat base 12 and the extension member 14. Inflation of the bladder 22 forces the extension member 14 forward relative to the seat base 12 and unrolls a portion 24 of the seat cover 16.

Referring again to FIG. 1, the vehicle seat 10 includes a back 30 that is pivotal relative to the seat base 12. The seat base 12 includes side supports 32, as well as at least one base support cushion 34. The illustrated seat base 12 includes three base support cushions 34. The entire vehicle seat 10 may be located in the driver's side, passenger side, or rear passenger positions of a vehicle. The extension member 14 is operable between an extended position 35 (FIG. 7) and a retracted position 37 (FIG. 3) to change the effective length of the vehicle seat 10.

Figure 2:
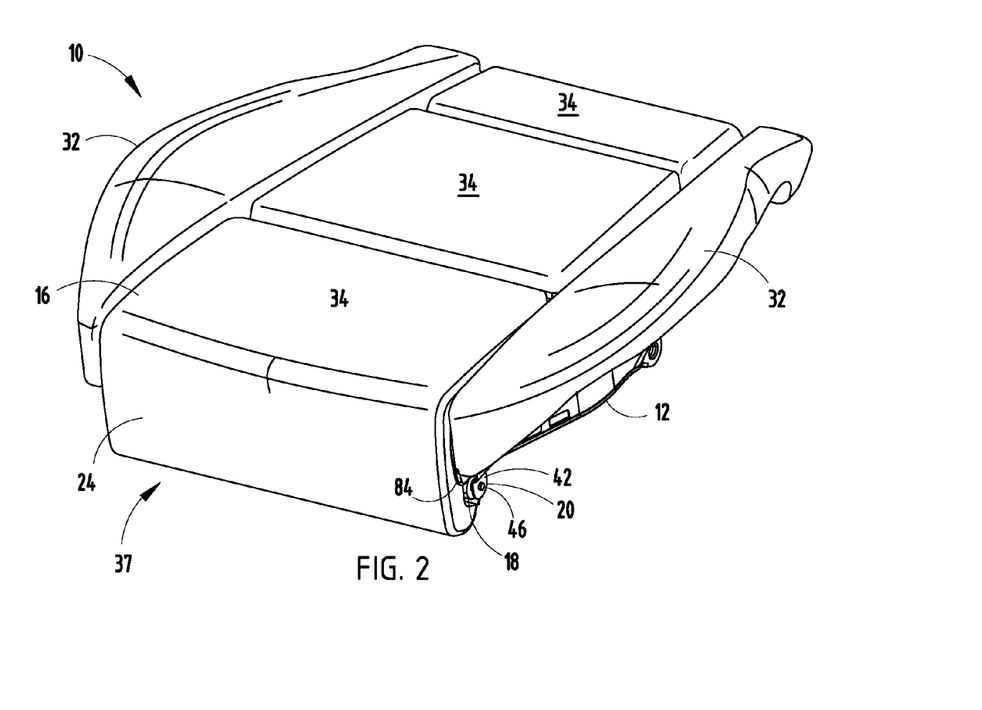
FIG. 2 is an enlarged top perspective view of the seat of FIG. 1.
Figure 3:
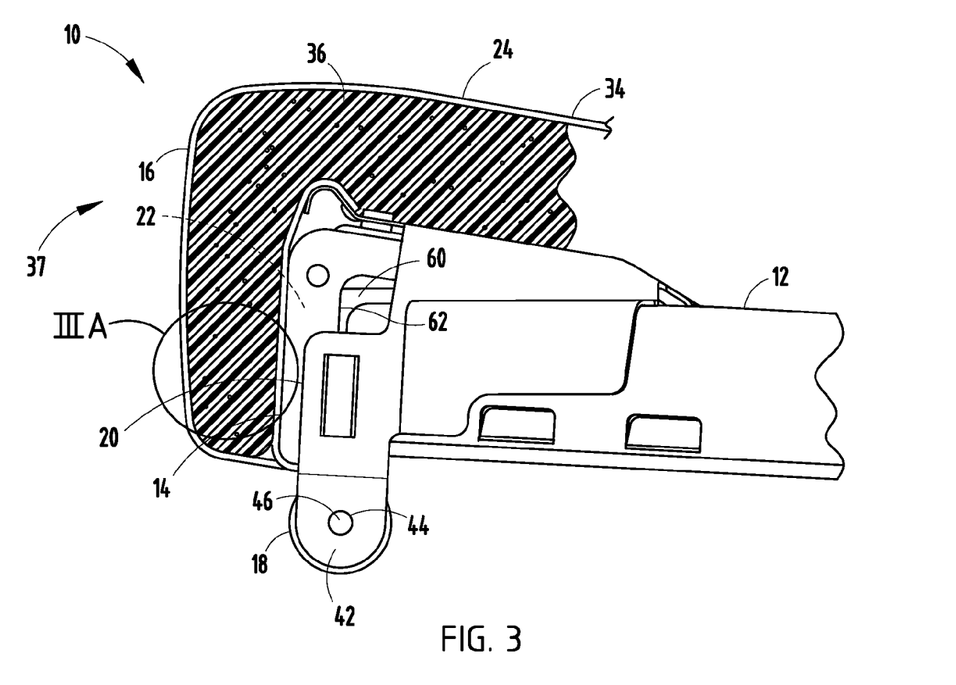
FIG. 3 is a partial side cross-sectional view of a portion of FIG. 2.
Figure 3A:
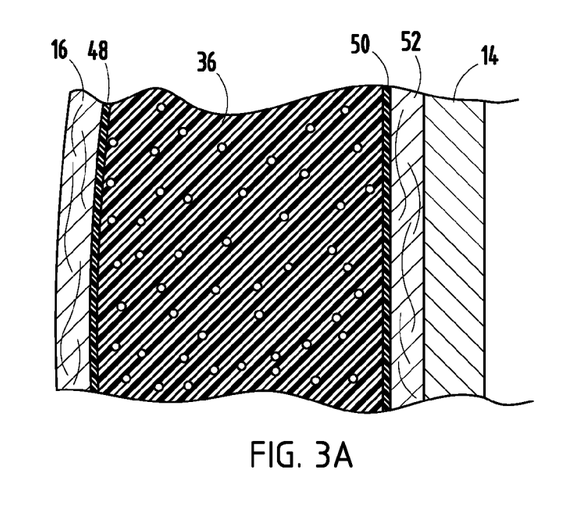
FIG. 3A is an enlarged partial cross-sectional view of the area IIIA of FIG. 3.

Referring now to FIGS. 2, 3, and 3A, the seat cover 16 extends over a cushion 36 disposed between the seat base 12 and the seat cover 16. Unlike some prior art designs, the seat cover 16 does not include expansion seams that allow movement of a forward end of the vehicle seat 10 relative to a rearward end. Rather, the vehicle seat 10 includes an unrollable seat cover, as explained herein in further detail.

Figure 5:
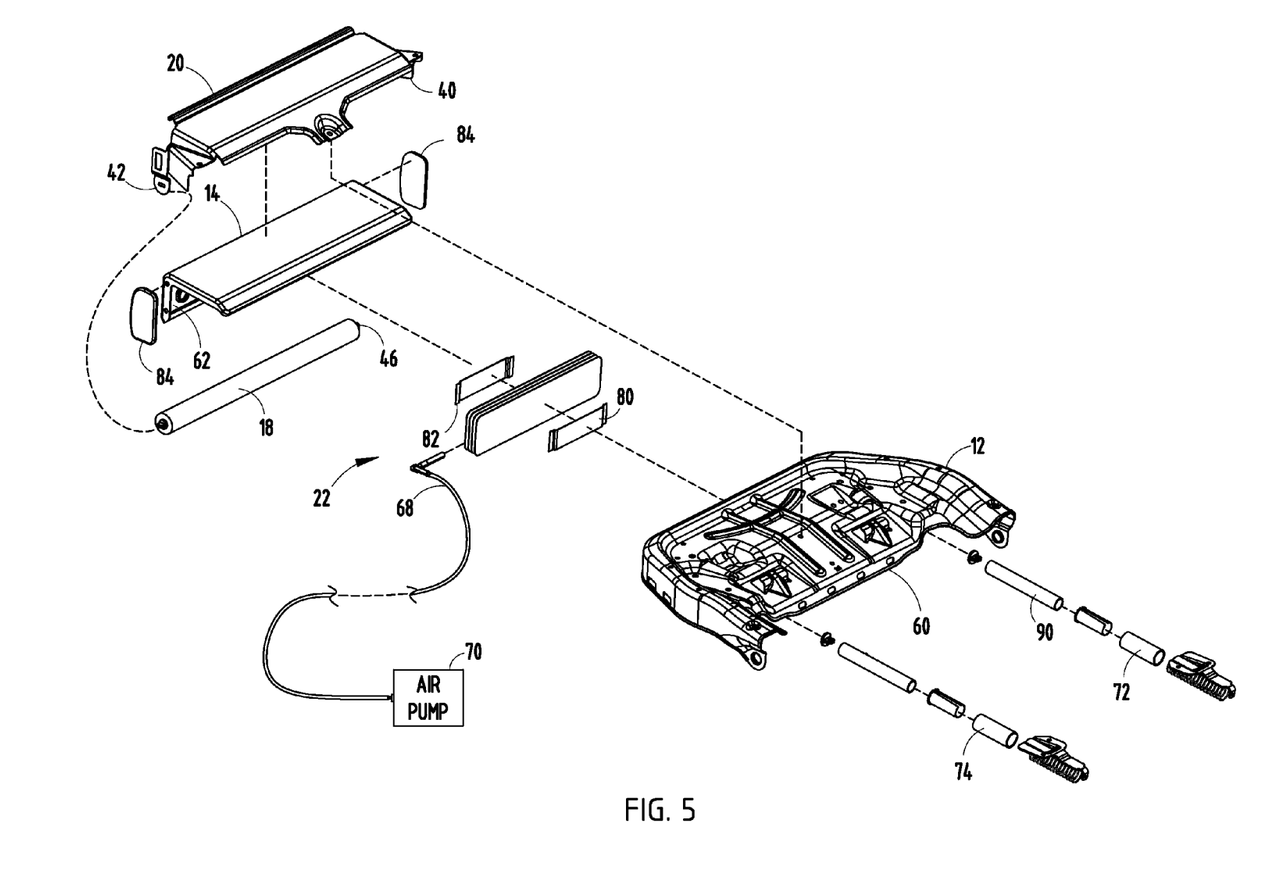
FIG. 5 is a top perspective exploded view of one embodiment of a seat cushion extension mechanism.

Referring again to FIGS. 2, 3, and 3A, a portion of the seat cover 16 wraps around the roller 18 positioned below the seat pan 20. The seat pan 20 has first and second downwardly extending flanges 40, 42 (FIG. 5). The roller 18 is connected to the first and second flanges 40, 42 that include an aperture 44 for receiving a spring-biased pin 46 that extends through the roller 18. The extension member 14 is slidably connected with the seat base 12 between the extended position 35 (FIG. 7) and the retracted position 37 (FIG. 3). To facilitate translation of the cushion 36 when the extension member 14 is in the extended position 35, a first layer of low friction material 48 is disposed between the seat cover 16 and the cushion 36. In addition, a second layer of low friction material 50 is positioned between the cushion 36 and a trim interior 52. The trim interior 52 is disposed adjacent to the extension member 14, as shown in FIG. 3A.

Figure 4:
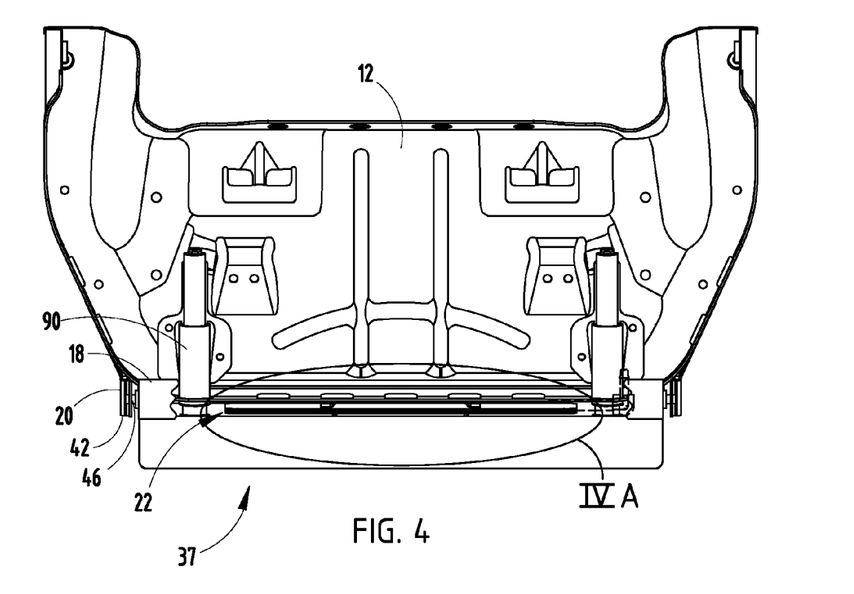
FIG. 4 is a bottom elevational view of one embodiment of a seat base.
Figure 4A:
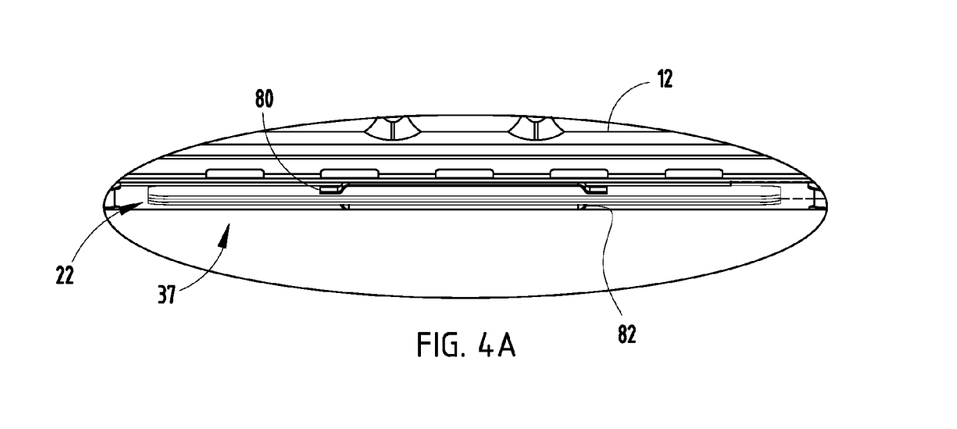
FIG. 4A is an enlarged partial view of area IVA of FIG. 4.

Referring now to the embodiment illustrated in FIGS. 4, 4A, and 5, the bladder 22 is positioned between a front wall 60 (FIG. 3) of the seat base 12 and a front wall 62 (FIG. 3) of the extension member 14. The bladder 22 comprises a plurality of baffles 64 that define a plurality of cavities 66 in the inflatable bladder 22. The inflatable bladder 22 is connected with an air hose line 68 that is in turn connected with a pump 70 disposed below the vehicle seat 10. First and second spring cylinders 72, 74 are positioned on either side of the bladder 22 and provide a spring bias that urges the extension member 14 rearward to the retracted position 37 relative to the seat base 12. Accordingly, when the inflatable bladder 22 is empty, the extension member 14 is in the retracted position 37 as a result of the force applied by the spring-bias of the spring cylinders 72, 74 (FIG. 4).

Referring now to FIG. 5, the seat pan 20 is fixedly connected to the seat base 12 and provides support to the underside of a user's legs. The first and second spring cylinders 72, 74 are disposed below the seat base 12 on either side of the bladder 22. The bladder 22 includes first and second brackets 80, 82 (FIG. 4A) that secure the bladder 22 to the front wall 60 of the seat base 12 and the front wall 62 of the extension member 14, respectively. Trim pieces 84 are disposed on either side of the extension member 14 so that the bladder 22 is not exposed when in use.

Figure 6:
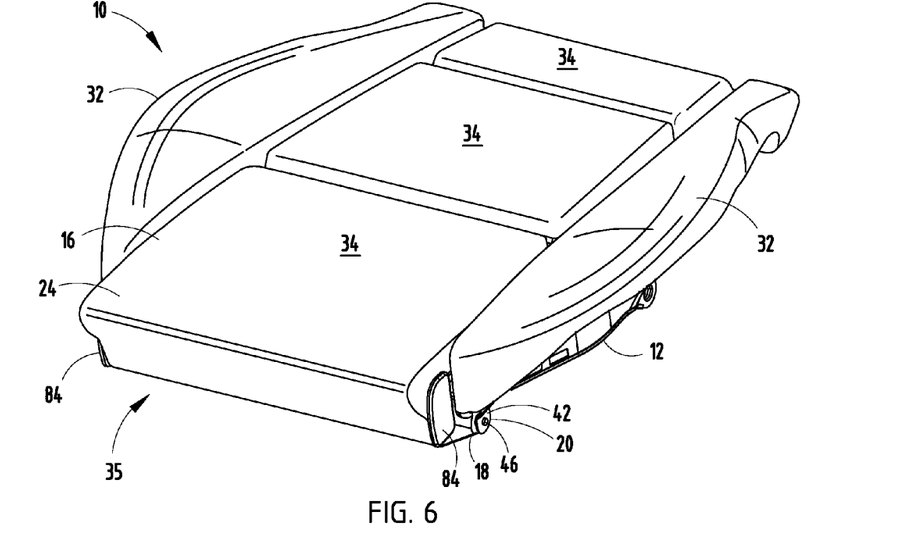
FIG. 6 is a top perspective view of the seat with the seat cushion in an extended position.
Figure 7:
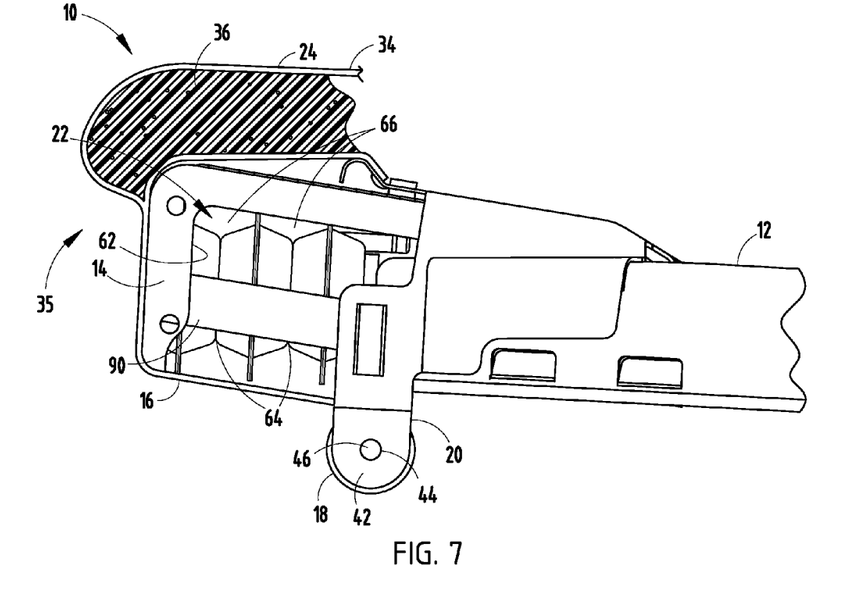
FIG. 7 is a partial side cross-sectional view of the seat cushion in the extended position.

Referring now to FIGS. 6 and 7, when the pump 70 is activated, air is forced into the hose line 68 that is connected with the bladder 22. The bladder 22 fills with air, which consequently pushes the extension member 14 to the extended position 35. As the bladder 22 continues to fill with air, the extension member 14 is guided to the extended position 35 on guides 90 disposed on either side of the bladder 22. At the same time, while the bladder 22 inflates with air and expands, thus pushing the extension member 14 forward to the extended position 35, the cushion 36 rotates upwardly over the extension member 14 sliding against the low friction materials 48, 50 that exist between the seat cover 16 and the cushion 36, as well as between the trim interior 52 and the cushion 36.

Figure 8:
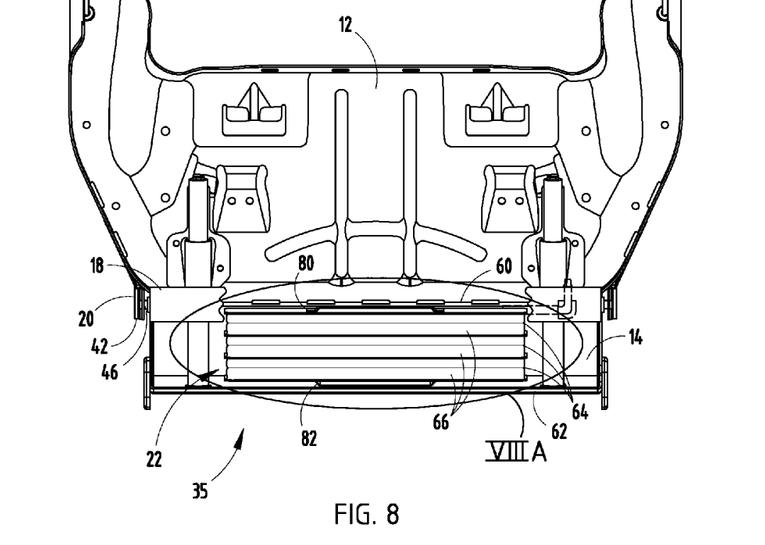
FIG. 8 is a bottom elevational view of the seat base with the seat cushion in the extended position.
Figure 8A:
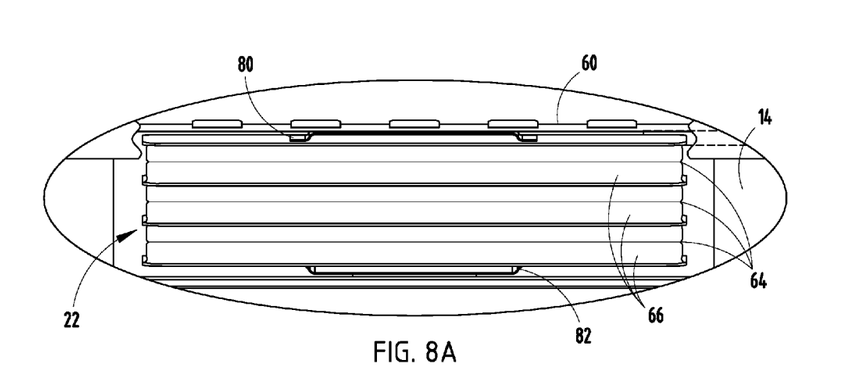
FIG. 8A is an enlarged partial bottom perspective view of area VIIIA of FIG. 8.

Referring now to FIGS. 8 and 8A, as the bladder 22 fills with air, the baffles 64 and air cavities 66 fill up, thus expanding the bladder 22 as a whole. As the bladder 22 expands, the bladder 22 applies force to both the extension member 14 and the seat base 12, which causes the extension member 14 to move forward toward the extended position 35. As the bladder 22 expands, the spring cylinders 72, 74 are compressed.

Figure 9:
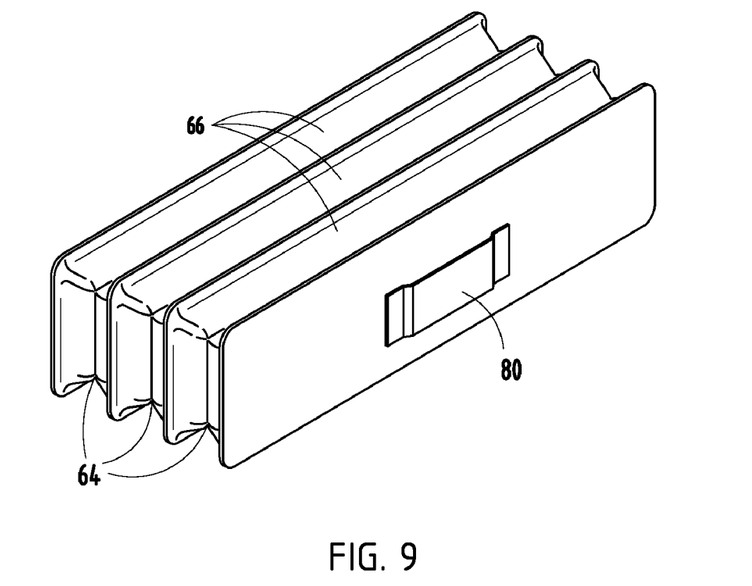
FIG. 9 is one embodiment of an air bladder of the present invention.
Figure 10:
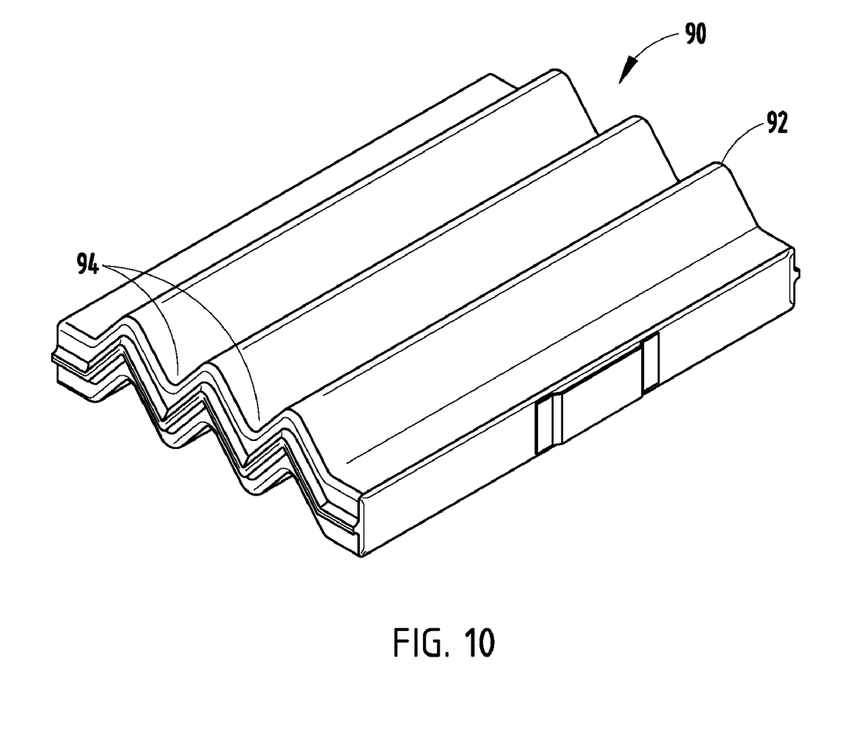
FIG. 10 is another embodiment of an air bladder of the present invention.

Referring now to FIGS. 9 and 10, the bladder 22 may have a construction as explained above. However, in another embodiment shown in FIG. 10, a bladder 90 includes a construction, wherein the plurality of air cavities 94 are formed between baffles 92. The baffles 92 are formed at a valley portion of the bladder 90, and the cavities 94 extend between the baffles 92. The construction forms a zigzag-type shape as the bladder 90 expands, with each cavity 94 having a V-shaped cross-section.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat comprising:
    a seat base;
    an extension member operably connected to the seat base;
    a seat pan extending over a portion of the seat base;
    a seat cover extending over the extension member and seat base;
    a spring-biased roller disposed below the seat pan and upon which a portion of the seat cover wraps when the extension member moves to a retracted position; and
    a bladder disposed between the seat base and the extension member, wherein inflation of the bladder forces the extension member forward relative to the seat base which unrolls a portion of the seat cover.

2. The vehicle seat of claim 1, wherein the seat cover does not include any expansion seams.

3. The vehicle seat of claim 1, wherein the bladder includes a V-shaped cross-section formed by upwardly-extending first and second cavities.

4. The vehicle seat of claim 1, wherein the bladder includes a plurality of baffles that define a plurality of cavities.

5. The vehicle seat of claim 1, further comprising:
    plastic covers disposed on first and second sides of the extension member.

6. A vehicle seat extension mechanism comprising:
    an extension member operably connected to a seat base;
    a seat cover having a cover portion disposed on a low-friction material above the seat base, and an excess portion disposed below the extension member; and
    an inflatable bladder disposed between the seat base and the extension member, wherein inflation of the bladder forces the extension member forward, thereby withdrawing the excess portion from below the extension member.

7. The vehicle seat extension mechanism of claim 6, further comprising:
    plastic covers disposed on first and second sides of the extension member.

8. The vehicle seat extension mechanism of claim 6, wherein the extension member is biased to a retracted position.

9. The vehicle seat extension mechanism of claim 8, wherein the extension member is biased by at least one spring-loaded cylinder operably connected to the seat base and the extension member.

10. The vehicle seat mechanism of claim 6, wherein the bladder includes a plurality of baffles that define a plurality of cavities.

11. The vehicle seat extension mechanism of claim 6, further comprising:
    a seat pan extending over a portion of the seat base.

12. The vehicle seat extension mechanism of claim 11, further comprising:
    a seat cushion extending over a portion of the seat pan.

13. The vehicle seat extension mechanism of claim 12, further comprising:
    a low friction material disposed between the seat cover and the seat cushion.

14. A method for extending a vehicle seat comprising:
    operably connecting an extension member with a seat base;
    slidably positioning a seat cover over the extension member;
    storing excess seat cover material below the extension member;
    positioning an inflatable bladder between the seat base and the extension member; and
    inflating the bladder to force the extension member to move away from the seat base and withdraw the excess seat cover material from below the extension member.

15. The method of claim 14, wherein the step of positioning the inflatable bladder between the seat base and the extension member further comprises:
    providing a plurality of baffles that define a plurality of cavities in the inflatable bladder.

16. The method of claim 14, the method further comprising:
    biasing the extension member to a retracted position.

17. The method of claim 14, the method further comprising:
rotatably connecting a spring-biased roller below the extension member upon which a portion of the seat cover wraps when the extension member moves to a retracted position.

18. The method of claim 14, the method further comprising:
inserting a low friction material disposed between the seat cover and a seat cushion disposed on the seat pan.

* * * * *